United States Patent [19]

Flower

[11] Patent Number: 5,480,165
[45] Date of Patent: Jan. 2, 1996

[54] BRUSH SEAL ASSEMBLY

[75] Inventor: Ralph F. J. Flower, Devizes, England

[73] Assignee: Cross Manufacturing Company Limited, England

[21] Appl. No.: 107,747
[22] PCT Filed: Feb. 19, 1992
[86] PCT No.: PCT/GB92/00289
  § 371 Date: Aug. 19, 1993
  § 102(e) Date: Aug. 19, 1993
[87] PCT Pub. No.: WO92/14951
  PCT Pub. Date: Sep. 3, 1992

[30] Foreign Application Priority Data

Feb. 19, 1991 [GB] United Kingdom ............ 9103459

[51] Int. Cl.⁶ ............................ F16J 15/447
[52] U.S. Cl. ......................... 277/53; 277/188 R
[58] Field of Search ................. 277/53, 188 R; 415/173.5, 174.5

[56] References Cited

U.S. PATENT DOCUMENTS

| | | | |
|---|---|---|---|
| 885,032 | 4/1980 | De Ferranti | 277/53 |
| 4,756,536 | 7/1988 | Belcher | 277/53 |
| 5,031,922 | 7/1991 | Heydrich | 277/53 |
| 5,066,024 | 11/1991 | Reisinger et al. | 277/53 |
| 5,074,748 | 12/1991 | Hagle | 277/53 X |
| 5,090,710 | 2/1992 | Flower | 277/53 |
| 5,106,104 | 4/1992 | Atkinson et al. | 277/53 X |
| 5,201,530 | 4/1993 | Kelch et al. | 277/53 |
| 5,335,920 | 8/1984 | Tseng et al. | 277/53 X |

FOREIGN PATENT DOCUMENTS

| | | | |
|---|---|---|---|
| 0391676 | 10/1990 | European Pat. Off. . | |
| 1952984 | 4/1970 | Germany | 277/53 |
| 0439367 | 12/1935 | United Kingdom | 277/53 |
| 2198195 | 8/1988 | United Kingdom . | |
| 9205378 | 4/1992 | WIPO | 277/53 |
| 9303299 | 2/1993 | WIPO | 277/53 |

*Primary Examiner*—William A. Cuchlinski, Jr.
*Assistant Examiner*—John L. Beres
*Attorney, Agent, or Firm*—Andrus, Sceales, Starke & Sawall

[57] ABSTRACT

A brush seal assembly for effecting a seal between a first component (12) and a surface of a second component (11) movable relative to the first component. The assembly has a first row of bristles (17) arranged to be supported by the first component (12) and to extend towards but not touch the surface of the second component (11), and a second row of bristles (19) arranged to wipe over the surface of the second component which second row of bristles (19) lies against one side of the first row of bristles (17). The bristles (17) of the first row are shorter than those of the second row, and have a greater stiffness. The seal assembly includes a backing plate (15) intended to be disposed on the low pressure side of the seal and which supports the adjacent row of bristles. Depending upon the intended use, either the first row or the second row of bristles may be supported by the backing plate (15).

11 Claims, 4 Drawing Sheets

BRUSH SEAL ASSEMBLY

BACKGROUND OF THE INVENTION

1. Field of the Invention

This invention relates to a brush seal assembly adapted to effect a seal between a first component and a surface of a second component which is relatively movable with respect to the first component.

2. Description of the Related Art

It is frequently necessary to effect a fluid-tight seal between two relatively movable components, such as between a rotatable shaft and a housing having a bore through which the shaft extends. Innumerable seal designs have been proposed for this purpose and a machine designer has to select the most appropriate type of seal, having regard to the likely operating conditions to be encountered in service.

For the case of a shaft extending through a bore in a housing and which shaft rotates at a relatively high speed in the presence of pressurised hot gases, such as may be encountered in a gas turbine or a jet engine, various designs of brush seal have been developed in an attempt to overcome the unsatisfactory performance of simpler seals having for example a synthetic elastomeric annular sealing member mounted in the bore of the housing and rubbing on the surface of the shaft. In a brush seal, a plurality of fine bristles (such as of bronze or stainless steel wire) are held in a carrier mounted on the housing, with the tips of the bristles wiping the surface of the shaft so as to effect a seal thereagainst.

In a typical brush seal intended for use with a pressure difference thereacross, the bristles are supported against deflection in a direction parallel to the shaft axis for the greater part of the length of the bristles by means of an annular backing plate on the low-pressure side of the seal, with the tips of the bristles projecting radially beyond the backing plate to wipe against the shaft surface to be sealed. If it can be expected that the shaft is likely to perform relatively large radial excursions—for instance, as may occur when an engine rotor is being run up to operating speed—the clearance between the backing plate and the shaft must be increased, so leading to a greater unsupported length of bristle, projecting beyond the backing plate. If then the seal is subjected to a relatively large pressure difference, the unsupported bristle tips projecting beyond the backing plate will tend to deflect towards the low pressure side and so lift clear of the shaft, and the sealing effect will be lost. If the bristles are made stiffer (for example by increasing the diameter of each bristle) the bristles may be too stiff to give an adequate sealing function able to accommodate minor radial excursions between the shaft and the housing; also rapid wear of the shaft may be expected as a consequence of the relatively stiff bristles wiping the shaft.

In addition to the above problem, it is possible for a brush seal to be subjected to an abnormal pressure surge where the side of the seal normally subjected to high pressure is suddenly subjected to a lower pressure than is present on the other side of the seal. If this occurs, the seal can be destroyed. It will be appreciated that it is in general not possible to employ a second backing plate on the high pressure side of the seal, since the pressure of the two backing plates is likely to interfere with the free movement of the bristles.

It is a principal aim of the present invention to provide a brush seal assembly adapted to effect a seal between two relatively movable components and which is able to accommodate relatively large excursions of one component with respect to the other and out of the normal line of movement between the two components, and yet which seal assembly is still able to achieve a good sealing effect notwithstanding a significant pressure difference thereacross.

SUMMARY OF THE INVENTION

According to the present invention, there is provided a brush seal assembly for effecting a seal between a first component and a surface of a second component relatively movable with respect to the first component, which seal assembly comprises a backing plate adapted for mounting on the first component to extend towards said surface of the other component, a first row of bristles projecting beyond the backing plate towards said surface of the other component, and a second row of bristles lying against the bristles of the first row, the bristles of the second row projecting beyond the tips of the bristles of the first row and adapted to contact and effect a seal against said surface of the other component, and a majority of the bristles of the second row each having a lesser stiffness than the stiffness of each of a majority of the bristles of the first row.

In the following further description of the present invention, reference will primarily be made to the sealing of a housing (the first component) to a rotatable shaft (the second component) extending through a bore in the housing. It will however be understood that the brush seal assembly may be used to effect a seal between other relatively movable components besides a housing and a shaft, and references herein to a housing and to a shaft should be construed accordingly.

One side of the first row of bristles may lie against and be supported by the backing plate, with the second row of bristles lying against the bristles of the first row on the other side thereof. Such a seal assembly is able to accommodate relatively large movements between the first and second components in a direction normal to a tangent to the surface of the second component, since a relatively large clearance may be provided between the backing plate mounted on the first component and said surface of the second component. The bristles effecting the seal against said surface (the bristles of the second row) may be of a relatively low stiffness, such as are commonly employed in the brush seal art, and yet those bristles are supported against deflection under an applied high pressure by the first row of bristles which are relatively stiff but which do not ordinarily contact said surface of the second component. Should however the second component perform a relatively large excursion with respect to the first component, that may be accommodated by said surface initially contacting and perhaps then also deflecting the bristles of the first row, without contact occurring between the second component and the backing plate. In this way, damage will be avoided because occasional contact between said surface of the second component and the bristles of the first row will not adversely affect seal performance.

As an alternative, the second row of bristles may lie against and be supported by the backing plate, with the first row of bristles lying against the bristles of the second row on the side thereof remote from the backing plate. Such a brush seal is able to withstand an abnormal reverse pressure surge with a much reduced likelihood of damage, since the stiffer first row of bristles will serve to prevent excessive deflection of the bristles of the second row during such a pressure surge. Despite this, since the bristles of the first row are flexible the sealing effect of the bristles of the second row is not significantly affected by the pressure of the first row of bristles lying against one side of the second row, with the backing plate against the other side of the first row.

The bristles of the first row may be given a greater stiffness than those of the second row by an appropriate selection of the material from which the bristles are made. Preferably, though, at least a majority of the bristles of the second row each has a smaller cross-sectional area than the cross-sectional area of each of a majority of the bristles of the first row.

Most preferably, each bristle of the first row has substantially the same cross-sectional area; equally, each bristle of said second row may have substantially the same cross-sectional area, which area is smaller than that of each bristle of the first row. Moreover, each row of bristles advantageously comprises a mass of bristles in a closely packed manner both across the width of the row and along its length—that is to say, in the case of a shaft seal, each row has an axial width made up from a plurality of closely packed bristles. Typically, in the axial direction, the width may be made up from 2 to 10 bristles.

In a preferred form of brush seal assembly of this invention, the diameter of each bristle in the first row may be from 2 to 10 times as great as the diameter of each bristle in the second row. Moreover, though the bristles in each row may be made of substantially the same material, in certain circumstances it may be advantageous to manufacture the bristles of the first row from a relatively high stiffness material and to manufacture the bristles of the second row from a softer material better able to effect a running seal against a shaft.

For certain applications of the seal assembly of this invention, a relatively thin spacer ring may be disposed between the rows of bristles at the root end thereof (that is, the ends of the bristles remote from the tips adjacent or touching the surface of the shaft). Such a spacer ring will have the effect of separating the rows of bristles in the region of their root ends, whereby the bristles of the second row are supported for a part only of their length which overlies the bristles of the first row. This construction allows a more compact bristle line at the ends of the bristles of the second row.

A modified form of brush seal assembly of this invention may have a third and possibly even further rows of bristles, with the bristle stiffness reducing for each subsequent row of bristles, and only the tips of the last row of bristles wiping the sealing surface of the second component. In such a modified form of brush seal, the tips of each row of bristles should project beyond the bristles of the preceding row, so that the bristles of one row are supported other than at their tips by the bristles of the preceding row. In this way, all of the preceding rows lend support to the bristles of the ultimate row, to resist deflection of the bristles of that row under a high pressure difference across the seal, whilst at the same time allowing the accommodation of relatively large excursions of the shaft.

An alternative modified brush seal assembly of this invention may have a third row of bristles similar to the first row, with the second row disposed between the first and third rows. Such a seal assembly has the combined advantages discussed above—that is to say, it may accommodate unusually large shaft excursions because of the clearance between the shaft and the backing plate can be increased in view of the pressure of the first row of bristles; and it may also withstand an abnormal reverse pressure surge without damage to the second row, because of the presence of the third row of bristles.

BRIEF DESCRIPTION OF THE DRAWINGS

By way of example only, four specific embodiments of brush seal assembly constructed and arranged in accordance with the present invention will now be described in detail, reference being made to the accompanying drawings, in which.

DESCRIPTION OF THE PREFERRED EMBODIMENTS

Figure 1:
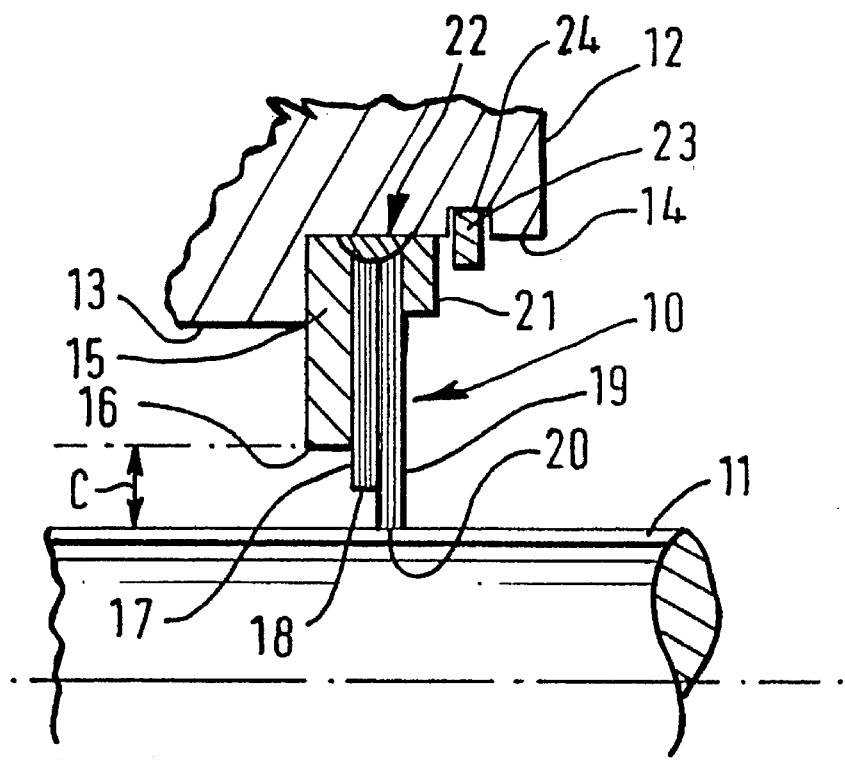
FIG. 1 is a cross-section taken through a first embodiment of seal assembly, on a radial plane thereof.
Figure 2:
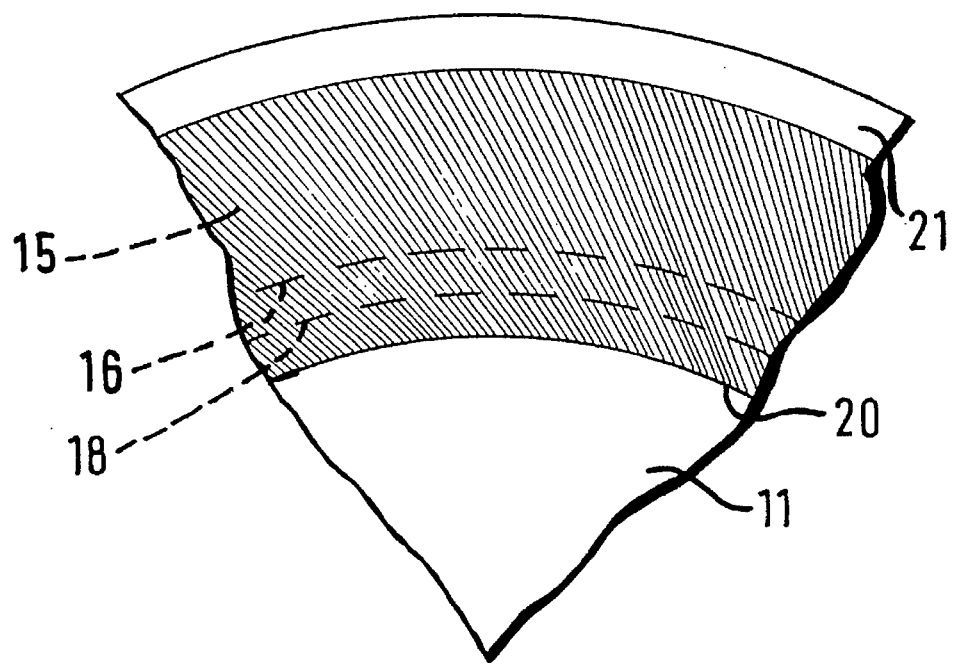
FIG. 2 is a partial axial end view on the seal illustrated in FIG. 1.

Referring initially to FIGS. 1 and 2, the brush seal assembly 10 of this invention is intended to effect a seal between a rotatable shaft 11 and a housing 12 having a bore 13 through which the shaft 11 extends. The seal assembly 10 is mounted in a counterbore 14 coaxial with the bore 13 and comprises an annular backing plate 15 having an internal bore 16 of a diameter greater than the diameter of the shaft 11, whereby a clearance C is defined therebetween. Lying against the backing plate 15 is a first annular row of bristles 17, each bristle being of about 0.010" diameter (about 0.25 mm), and the free tips 18 of which bristles project beyond the inner periphery of the backing plate 15, but which do not contact the shaft 11. Lying against and supported by the first row of bristles 17 is a second row of bristles 19, each bristle being of about 0.0028" diameter (about 0.07 mm), and being of such a length that the free tips 20 of those bristles project beyond the tips 18 of the bristles 17, and wipe against the shaft 11. The seal assembly is completed by a clamp ring 21, the backing plate 15, the root ends 22 of the bristles 17 and 19 and the clamp ring 21 all being welded together or otherwise bonded by a suitable process, and the seal assembly 10 being held in position in the counter-bore 14 by means of a circlip 23, located in a groove 24 formed in the counter-bore.

As can be seen from FIG. 2, all of the bristles, though extending generally radially, nevertheless lie at a constant angle to the true radial direction; the shaft 11 should rotate in the direction marked A, in order that the tips 20 of the bristles 19 may wipe smoothly over the surface of the shaft, and deflect along their lengths should the shaft perform an excursion in a radial plane.

The bristles 17 and 19 are made of essentially the same material, but the bristles 17 have a greater diameter than the bristles 19. Typically, the bristles 17 will have a diameter of about 4 times as great as the diameter of the bristles 19.

When in use, if the seal assembly is subjected to a high pressure difference, with the high pressure on the right hand side as illustrated in FIG. 1, the tips 20 of the bristles 19 will tend to deflect to the low pressure (left hand) side of the seal assembly but in view of the support provided by the bristles 17, very little deflection will take place and an excellent sealing effect will still be maintained. If the shaft 11 should undertake minor excursions in a radial plane, these will be accommodated by deflection of the bristles 19, but should the shaft perform relatively large excursions, then the shaft will contact the bristles 17 and these too may be deflected notwithstanding their greater stiffness. Since the shaft ordinarily will not be in contact with the bristles 17, no rapid wear of the shaft will be caused despite the greater stiffness of those bristles.

Figure 3:
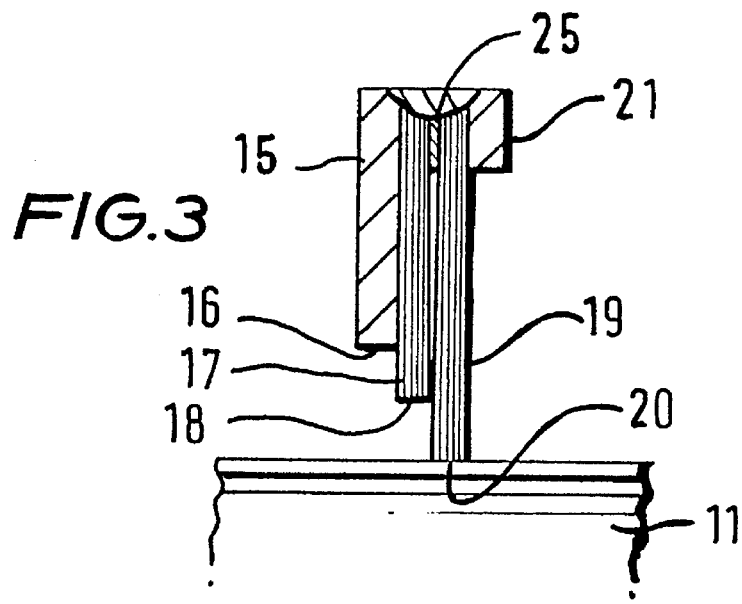
FIG. 3 is a view similar to that of FIG. 1, but of a second embodiment of brush seal assembly of this invention.

FIG. 3 shows an alternative form of seal assembly, and like parts with those of FIGS. 1 and 2 are given like reference characters; those parts will not be described again here. In the seal of FIG. 3, there is provided between the bristles 17 and 19, at the root ends thereof, a relatively thin spacer ring 25, this spacer ring 25 being welded in position during assembly of the seal. Despite the provision of this ring 25, the bristles of the two rows thereof will be in close contact at least in the region of the tips 18 of the bristles 17, as the bristles tend to spread to some extent, so that the space created by the spacer ring 25 will be lost in the region of the bore of the backing plate 15. A more compact bristle line at the bore may be achieved by this construction, since the bristles converge with a conical profile.

Figure 4:
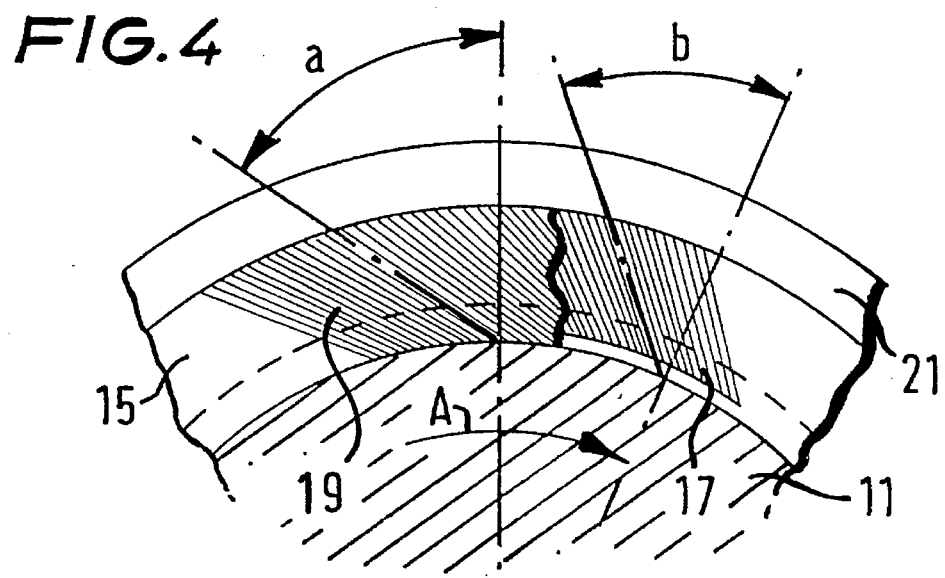
FIG. 4 is a view similar to that of FIG. 2, but of a second embodiment of seal assembly of this invention.

FIG. 4 shows an alternative embodiment of seal assembly of this invention, where the bristles 17 of the first row lie at an angle different to that of the bristles 19 of the second row. In all other respects, the seal assembly is the same as that of FIG. 2, but in this alternative embodiment, the likelihood of the bristles of the two rows becoming intermingled is much reduced.

Figure 5:
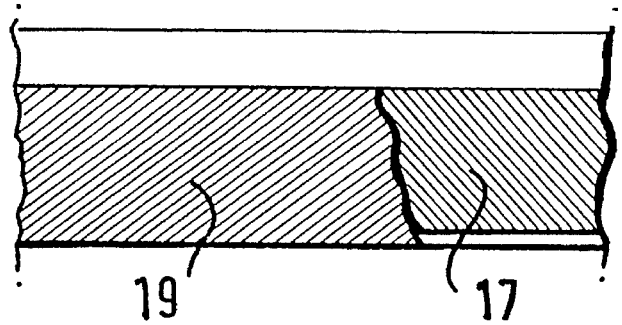
FIG. 5 is a partial end view of a third embodiment of seal assembly of this invention.

FIG. 5 shows a linear brush seal of this invention, which is constructed in much the same manner as has been described above, but in this case the back-plate 21 is linear, and the two rows of bristles 17 and 19 extend at substantially equal but opposite angles to that back-plate. This seal may be used to seal against a flat surface, and possesses the same advantage as that of the embodiment of FIG. 4.

Figure 6:
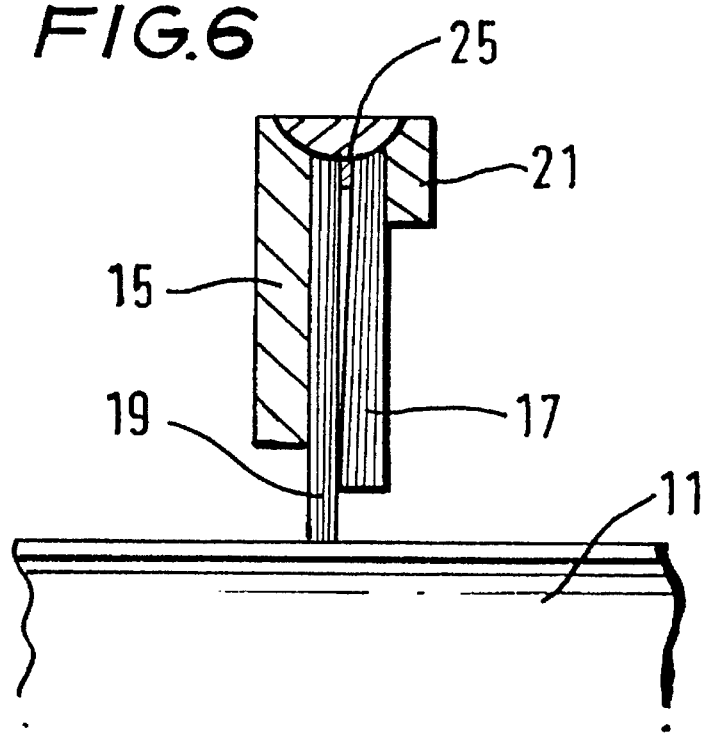
FIGS. 6 and 7 rear views similar to that of FIG. 1 but on fourth and fifth embodiments respectively of seal assemblies of this invention.

FIG. 6 shows a further brush seal assembly, generally similar to that of FIG. 3 but having the second row of bristles 19 lying against the backing plate 15, and the shorter, stiffer first row of bristles lying against the second row of bristles on the side thereof remote from the backing plate 15. As in the assembly of FIG. 3, there is a spacer ring 25 welded between the two rows of bristles at the root ends thereof. Thus, the bristles of the first row contact the bristles of the second row for a part only of their respective lengths, with that contact being concentrated towards the tip ends of the bristles.

As with the previous embodiments of seal, that of FIG. 6 is intended to have the backing plate on the low pressure side but the seal is able to withstand a reverse pressure surge in view of the presence of the relatively stiff first row of bristles on the normally high pressure side of the seal. In view of the flexible nature of those bristles, their presence does not adversely effect to any great extent the operation and sealing characteristics of the second row of bristles 19.

Figure 7:
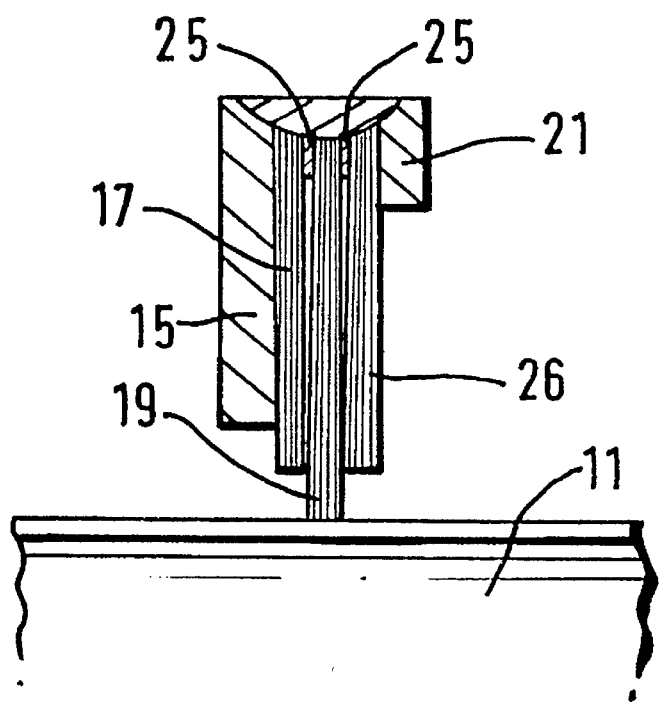
Figure 8:
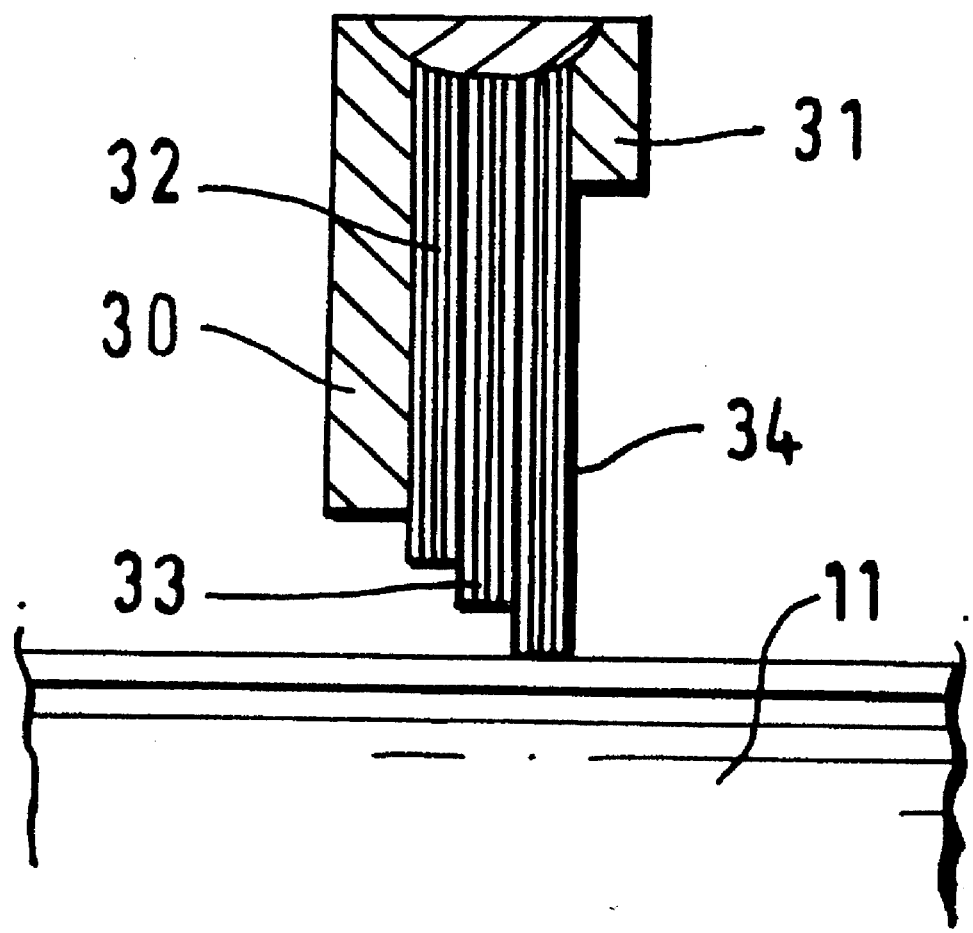
FIG. 8 is a sectional view similar to FIG. 1 of still another embodiment of the seal assembly of this invention.

FIG. 7 shows a further embodiment, incorporating the features of the seals of FIGS. 3 and 6. Here, there is provided a third row of bristles 26 substantially the same as the first row of bristles 17 and arranged on the high pressure side of the seal, as in the embodiment of FIG. 6. Thus, this seal assembly is able to withstand an abnormal reverse pressure surge in view of the presence of the third row of bristles 26, and also is able to accommodate relatively large excursions of the shaft in view of the presence of the first row of bristles 17, enabling the clearance between the shaft and the backing plate 15 to be increased.

I claim:

1. A brush seal assembly for withstanding a large pressure difference thereacross whilst effecting a seal between a first component and a surface of a second component which may perform excursions in a direction towards and away from the first component and which second component is also relatively movable in a direction normal to the excursion direction, which seal assembly comprises a backing plate adapted for mounting on the first component to extend towards said surface of the other component, the backing plate having a free edge spaced from said surface by a distance greater than the largest expected excursion of the second component, a first row of bristles projecting beyond the backing plate towards said surface of the other component, a second row of bristles projecting beyond the tips of the bristles of the first row and adapted to contact and effect a seal against said surface of the other component, one of the first and second rows of bristles bearing against and being supported by the backing plate, a majority of the bristles of the second row each having a lesser stiffness than the stiffness of each of a majority of the bristles of the first row, the first row of bristles lying against the bristles of the second row, and at least a majority of the bristles of the first row each having a larger cross-sectional area than the cross-sectional area of each of a majority of the bristles of the second row, said larger cross-sectional area bristles providing support for said bristles of said second row.

2. A brush seal assembly as claimed in claim 1, wherein the first row of bristles lies against and is supported by the backing plate, with the second row of bristles lying against the bristles of the first row on the side thereof remote from the backing plate.

3. A brush seal assembly as claimed in claim 1, in which the second row of bristles lies against and is supported by the backing plate, with the first row of bristles lying against the bristles of the second row on the side thereof remote from the backing plate.

4. A brush seal assembly as claimed in claim 1, wherein the bristles of the first row are given a greater stiffness than those of the second row by an appropriate selection of the material from which the bristles are made.

5. A brush seal assembly as claimed in claim 1, wherein each bristle of the first row has substantially the same cross-sectional area; and each bristle of the second row has substantially the same cross-sectional area smaller than that of each bristle of the first row.

6. A brush seal assembly as claimed in claim 1, wherein each row of bristles comprises a mass of bristles in a closely packed manner, both across the width of the row and along the length thereof.

7. A brush seal assembly as claimed in claim 1, wherein a relatively thin spacer ring is disposed between the two rows of bristles, at the root ends thereof.

8. A brush seal assembly as claimed in claim 1, wherein there is provided a third row of bristles similar to those of the first row, with the second row disposed between the first and third rows.

9. A brush seal assembly as claimed in claim 2, wherein the bristles of the first row are given a greater stiffness than those of the second row by an appropriate selection of the material from which the bristles are made.

10. A brush seal assembly as claimed in claim 9, wherein each row of bristles comprises a mass of bristles in a closely packed manner, both across the width of the row and along the length thereof.

11. A brush seal assembly for effecting a seal between a first component and a surface of a second component relatively movable with respect to the first component, which seal assembly comprises a backing plate adapted for mounting on the first component to extend towards said surface of the other component, a first row of bristles projecting beyond the backing plate towards said surface of the other component, a second row of bristles lying against the bristles of the first row, the bristles of the second row projecting beyond the tips of the bristles of the first row, and a third row of bristles lying against the bristles of the second row, the bristles of the third row projecting beyond the tips of the bristles of the second row and adapted to contact and effect a seal against said surface of the other component, a majority of the bristles of the second row each having a lesser stiffness than the stiffness of each of a majority of the bristles of the first row, and a majority of the bristles of the third row each having a lesser stiffness than the stiffness of each of a majority of the bristles of the second row.

* * * * *